United States Patent [19]

Takada et al.

[11] Patent Number: 4,470,270
[45] Date of Patent: Sep. 11, 1984

[54] AIR CONDITIONER SYSTEM FOR AN AUTOMOTIVE VEHICLE HAVING MAIN AND AUXILIARY COOLING UNIT

[75] Inventors: Yutaka Takada; Yutaka Obata, both of Yokohama, Japan

[73] Assignee: Nissan Motor Company, Limited, Yokohama, Japan

[21] Appl. No.: 356,450

[22] Filed: Mar. 9, 1982

[30] Foreign Application Priority Data

Mar. 18, 1981 [JP] Japan .................................. 56-37884

[51] Int. Cl.³ .............................................. B60H 3/04
[52] U.S. Cl. ........................................ 62/244; 62/408; 98/2.11; 165/42
[58] Field of Search ................. 62/186, 243, 244, 199, 62/200, 404, 408, 419, 426, 427, 323.4, 180; 98/2, 201, 2.11; 165/41, 42, 43; 236/49; 307/114

[56] References Cited

U.S. PATENT DOCUMENTS

| 366,124 | 7/1887 | McElroy | 307/114 |
| 529,532 | 11/1894 | Scribner | 307/114 X |
| 3,719,058 | 3/1973 | Waygood | 62/200 |
| 4,364,513 | 12/1982 | Tsuzuki et al. | 62/186 X |

OTHER PUBLICATIONS

Toyota Corona Celica Carina Air Conditioning System Repair Manual, #MAC-104, Nippondenso Co., Ltd., Kariya, Aichi, Japan, Dec. 1971, pp. 15-16, 31-32.

Primary Examiner—Harry Tanner
Attorney, Agent, or Firm—Lane, Aitken & Kananen

[57] ABSTRACT

An air conditioner system for an automotive vehicle is provided with a main and an auxiliary cooling unit for discharging cooling air to respective front and rear portions of the vehicle compartment. The main and auxiliary cooling units operate to control air flow amounts independently of each other. A main control switch for controlling the amount of cooling air from the main cooling unit cooperates with a pair of auxiliary cooling unit switches to control the auxiliary cooling unit. One member of the pair of auxiliary cooling unit switches is provided adjacent the driver's seat and the other adjacent the rear seat for turning the auxiliary cooling unit on and off. The auxiliary cooling unit can be controlled by either one of the pair of switches as long as the main control switch is on.

6 Claims, 4 Drawing Figures

AIR CONDITIONER SYSTEM FOR AN AUTOMOTIVE VEHICLE HAVING MAIN AND AUXILIARY COOLING UNIT

BACKGROUND OF THE INVENTION

The present invention relates generally to an air conditioner system for an automotive vehicle, which system includes a main and an auxiliary cooling unit. More particularly, the invention relates to an automotive vehicle air conditioner system having manual control switches for controlling the turning on and off of a blower fan corresponding to the cooperative operation of the main and auxiliary cooling units.

Conventionally, an automotive vehicle air conditioner system has a main and an auxiliary cooling unit. In such a system, the auxiliary cooling unit has a substantially smaller capacity than that of the main cooling unit. Therefore, to prevent the refrigerant of the air conditioner system from surging back, the auxiliary cooling unit can be driven only when the main cooling unit is driven. In the normal arrangement, a manual control switch for the main cooling unit is positioned adjacent a driver's seat and a manual control switch for the auxiliary cooling unit is provided adjacent a rear seat. This arrangement permits the driver to control only the main cooling unit.

If a passenger seated in the rear seat fails to turn off the auxiliary control switch upon leaving the vehicle, the auxiliary cooling unit continues to operate since it may not be controlled independently by the driver. This leads to wasting of energy by unnecessarily cooling the vehicle back compartment. On the other hand, if both of the main and auxiliary cooling unit control switches are provided adjacent the driver's seat, a passenger in the rear seat cannot control the auxiliary cooling unit as desire by himself.

SUMMARY OF THE INVENTION

It is an object of the present invention to provide an air-conditioning system having a main and an auxiliary cooling unit, in which the auxiliary cooling unit can be driven only when the main cooling unit is driven and the auxiliary cooling unit can be turned on/off by both the driver and a rear seat passenger.

Another object of the present invention is to provide the air-conditioning system for an automotive vehicle having a first switch preventing the turning on of the auxiliary cooling unit while the main unit is maintained off, and a second switch including two switch elements respectively operable by the driver and the passenger in the rear seat.

To accomplish the above-mentioned and other objects, there is provided an air-conditioning system for an automotive vehicle, which system includes a main cooling unit and an auxiliary cooling unit respectively connected to a common refrigerant source. The main and auxiliary cooling units are driven independently of each other. A switch is provided in a system circuit for preventing the auxiliary cooling unit from being turned on when the main cooling unit is kept off. Another switch is also provided in order to enable both the driver and the rear seat passenger to turn the auxiliary cooling unit on/off.

BRIEF DESCRIPTION OF THE DRAWINGS

The present invention will be understood more fully from the detailed description given hereinbelow and from the accompanied drawings of the preferred embodiments of the present invention, which, however, should not be taken as limitative of the present invention but rather for elucidation and explanation only.

In the drawings.

DESCRIPTION OF THE PREFERRED EMBODIMENTS

Figure 1:
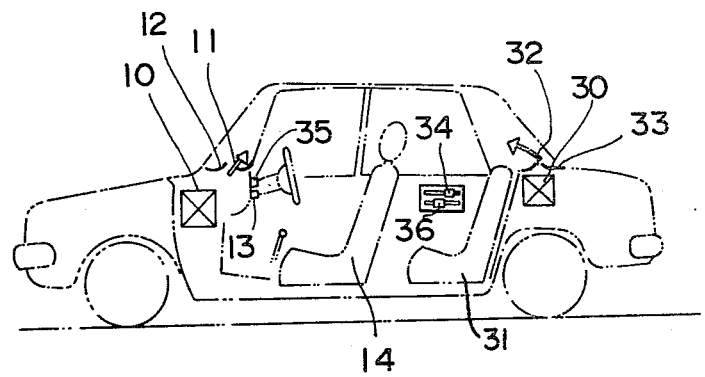
FIG. 1 is a fragmentary illustration of a first embodiment of an automotive air-conditioning system according to the present invention, which shows an arrangement of a main and an auxiliary cooling unit.

Referring now to the drawings, particularly to FIG. 1, there is illustrated fragmentarily an arrangement of a main and an auxiliary cooling unit 10 and 30 respectively of the preferred embodiment of an automotive air-conditioning system. The main unit 10 is provided at a front portion of a vehicle body so that it discharges cooling air through an outlet 11 provided at a front portion of the vehicle, such as in an instrument panel 12. The auxiliary cooling unit 30 is provided generally behind the rear seat 31 to discharge an auxiliary cooling air through an outlet 32 formed at a rear portion of the vehicle, such as in a rear parcel shelf 33.

A main control switch 13 for turning on/off the main cooling unit 10 and for the adjustment of the speed a fan of the main cooling unit is provided adjacent a driver's seat 14 to be controlled by a driver or a passenger in the front seat beside the driver's seat. An auxiliary control switch 34 for adjustment of the fan speed of the auxiliary cooling unit 30 is provided adjacent the rear seat 31 to be controlled by a rear seat passenger. On/off switches 35 and 36 are provided respectively adjacent the driver's seat 14 and the rear seat 31 so that the auxiliary cooling unit 30 can be turned on/off by both the driver and a rear seat passenger. The switches 35 and 36 are connected to each other so that either one can turn an auxiliary cooling unit drive circuit on and off by alternating the switch position thereof. For example, if both switches are set to position a, the auxiliary cooling unit will operate. Further, if both switches are set to position b, the auxiliary cooling unit will operate. If one of the switches 35 or 36 is in position a and the other switch is in position b, the auxiliary cooling unit will not operate. Such a circuit arrangement is achieved by providing a conducting line connecting the b position terminals of each switch 35 and 36 together and likewise connecting together the a position terminals.

Alternately, a circuit arrangement may be employed in which only the a position terminals of switches 35 and 36 are connected together or only the b position terminals. In this case, either switch 35 or 36 is always able to turn off the auxiliary cooling unit but the unit can be turned on only if both switches 35 and 36 are placed in a predetermined position (a, for example).

Figure 3:
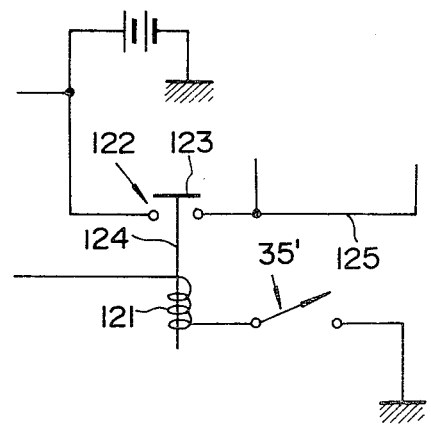
FIG. 3 is a circuit diagram showing an auxiliary cooling unit on/off switch of a modification of FIG. 1.

The circuit arrangement can be further modified to neglect the switch 35 as shown in FIG. 3. In this case, the auxiliary cooling unit 30 is turned on/off by the switch 35' facilitated adjacent the rear seat.

Figure 2:
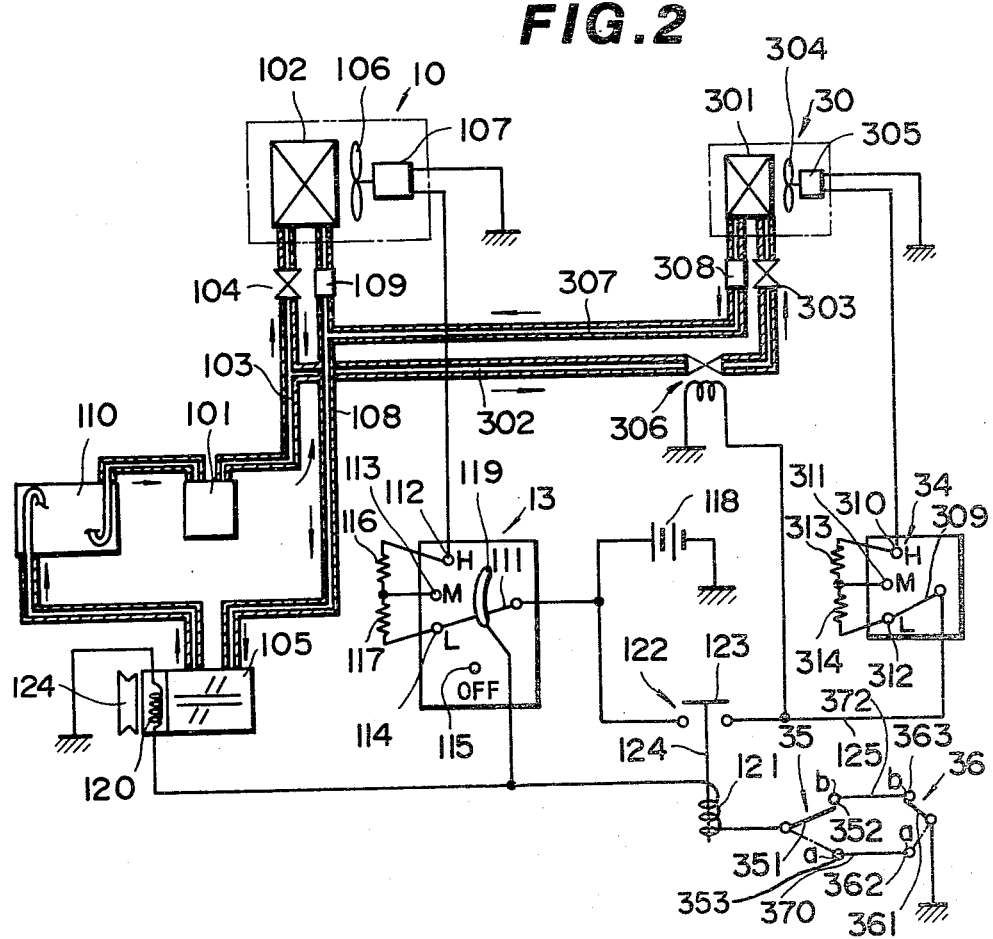
FIG. 2 is a circuit diagram of the first embodiment of the air-conditioning system of the present invention.

FIG. 2 shows the circuit of the foregoing preferred embodiment of the air-conditioning system. A refrigerant is circulated from a reservoir 101 to an evaporator 102 of the main cooling unit 10 via a refrigerant passage 103 and an expansion valve 104 by a compresor 105. Adjacent the evaporator 102, a cooling fan 106 with an electric motor 107 is provided to discharge a cooling air through the air outlet 11 in the instrument panel. The refrigerant supplied to the evaporator 102 is recirculated to the reservoir 101 via a return passage 108, a suction throttle valve 109, the compressor 105 and a condensor 110.

An evaporator 301 of the auxiliary cooling unit 30 is connected to the reservoir 101 via a branched passage 302 in which there is interpositioned an expansion valve 303. Similarly to the main cooling unit 10, a cooling fan 304 with an electric motor 305 is provided adjacent the evaporator 301. An electromagnetic valve 306 is also interposed in the branched passage 302. The electromagnetic valve 306 varies between an energized position in which it establishes fluid communication between the evaporator 301 and the reservoir 101, and a deenergized position in which it blocks fluid communication between the evaporator 301 and the reservoir 101. The electromagnetic valve 306 is controlled by the switch positions of the foregoing switches 35 and 36. The evaporator 301 is, in turn, connected to the return passage 108 via a return passage 307 with a suction throttle valve 308 joined to the return passage 307 so as to recirculate the refrigerant in the evaporator 301 to the reservoir 101.

It should be appreciated that, in the illustrated embodiment, the evaporator 102 of the main cooling unit 10 has a larger capacity than that of the evaporator 301 of the auxiliary cooling unit 30.

The electric motor 107 of the fan 106 is connected to the main control switch 13. The main control switch comprises a movable contact 111, stationary contacts 112, 113, 114 and 115 and resistors 116 and 117. The stationary contacts 112, 113 and 114 are arranged in positions respectively corresponding to high, medium and low speeds of the cooling fan. That is, the movable contact 111 contacts with the stationary contact 112 and connects in circuit an electric power source, i.e., the vehicle battery 118, with the electric motor 107. The movable contact 111 connects with the stationary contact 113 and connects in circuit the vehicle battery 118 with the electric motor 107 through a resistor 116. The movable contact 111 connects with the stationary contact 114, and connects in circuit the vehicle battery 118 and the electric motor 107 via the resistors 116 and 117. The stationary contact 115 corresponds to a switch off position for both the fan 106 and compressor 105.

The movable contact 111 is, in turn, connected to an elongated stationary contact 119. The stationary contact 119 is adapted to contact with the movable contact 111 when the latter is in an ON position. The stationary contact 119 is connected to an electromagnetic clutch 120 of the compressor 105 and a relay coil 121 of a relay switch 122. The relay switch 122 includes a switch member 123 having a stem 124 inserted into the relay coil. The switch member 123 is interposed in a circuit 125 connecting the vehicle battery 118 to the auxiliary control switch 34 so that it can establish electrical communication between the vehicle battery and the auxiliary control switch 34 while the relay coil 121 is energized during any ON position of the main control switch 13. The relay coil 121 is grounded via switches 35 and 36. The switches 35 and 36 are movable between the first and second position as set forth so that each of them can connect and disconnect the relay coil 121 to the ground. Thus, the relay coil 121 is energized while the main control switch 13 is kept on and it is grounded via the switches 35 and 36.

The auxiliary control switch 34 comprises a movable contact 309, stationary contacts 310, 311 and 312 and resistors 313 and 314. The movable contact 309 is connected to the vehicle battery 118 via the relay switch 122. On the other hand, the stationary contact 310 is connected to the electric motor 305 of the fan 304 of the auxiliary cooling unit 30. The stationary contacts 310, 311 and 312 are connected in series and the resistors 313 and 314 are inserted respectively between the stationary contacts 310 and 311 and 312. The movable contact 309 is moved by manual operation between the stationary contacts 310, 311 and 312 to control the fan speed at high, medium and low speed likewise to the foregoing main control switch.

In the switch positions as shown in FIG. 2, the main control switch 13 is at a low fan speed position with the movable contact 111 connected to the stationary contact 114. At this switch position, the movable contact 111 contacts the stationary switch 119 to close a circuit connecting the vehicle battery 118 to the electromagnetic clutch 120 of the compressor. Thus, the electromagnetic clutch 120 is energized to permit engine operation of the compressor 105 via a pulley 126 associated with a belt of the engine output shaft (not shown). At the same time, since the movable contacts 351 and 361 of the switches 35 and 36 respectively contact with the stationary contacts 352 (position b) and 363 (position b) to close a circuit grounding the vehicle battery voltage through the relay coil 121, the relay coil is energized to close the relay switch 122. Thus, the vehicle battery power is supplied to the electric motor 305 of the fan 304 via the relay switch 122, the movable contact 309, the stationary contact 312 and resistors 314 and 313 to drive the fan at low speed. At this time, the power is also applied to the electromagnetic valve 306 to energize the latter to permit the refrigerant to flow therethrough. Thus, the refrigerant from the compressor 105 can be circulated to both the evaporators 102 and 301 to enable the discharge of cooling air from both the outlets 11 and 32.

To stop the auxiliary cooling unit, either switch 35 or 36 is turned to the alternate position, i.e., either the movable switch 351 is turned to contact the stationary contact 353 (position a) or the movable contact 361 is turned to contact the stationary contact 362 (position a). At this position, the vehicle battery 118 is disconnected from ground to deenergize the relay coil 121. The relay switch 122 is thus opened to disconnect the auxiliary control switch 34 from the vehicle battery. At the same time power to the electromagnetic valve 306 is cut off to deenergize the valve and block the refrigerant flow therethrough.

If the auxiliary cooling unit is to be driven again, the switches 35 or 36 must be turned to the same position, a or b. In this switch position, the vehicle battery 118 is grounded to energize the relay coil 121 to place the air-conditioning system in a position similar to that explained as the initial position.

In a further modification, one of the conducting lines 370 or 372 may be removed. For example, if line 372 is removed, the auxiliary cooling unit will operate only if both switches 35 and 36 are in position a. Turning either switch 35 or 36 to position b will turn off the auxiliary cooling unit.

Figure 4:
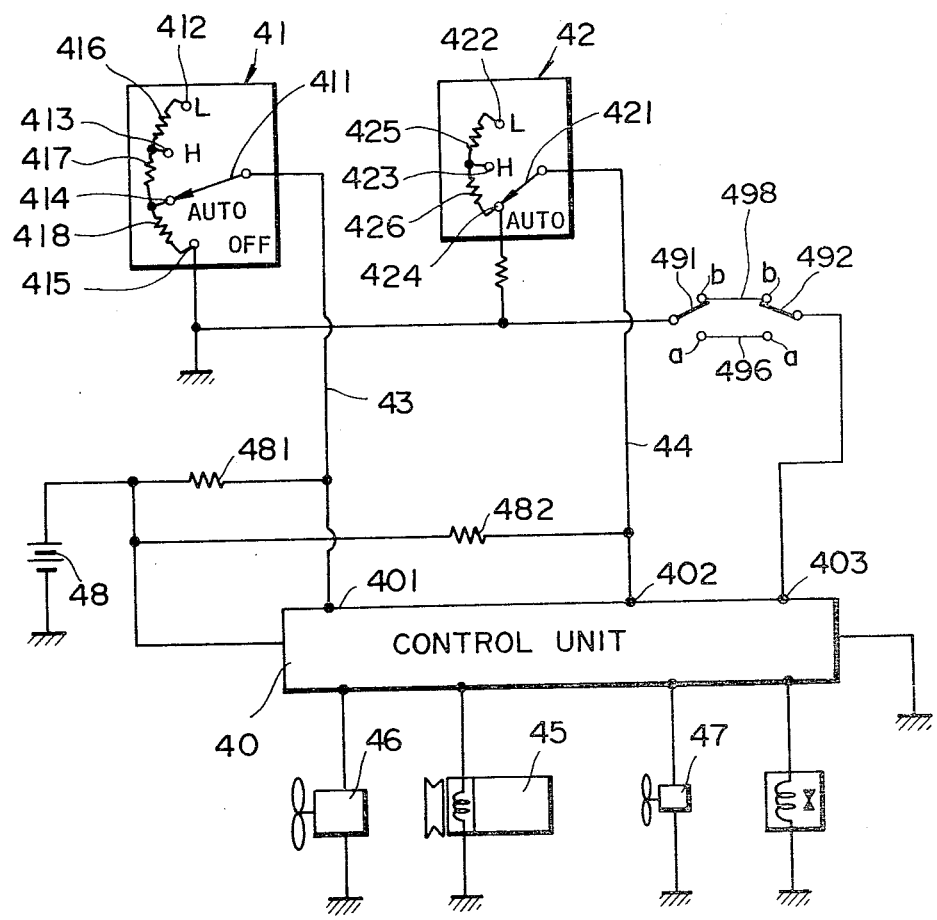
FIG. 4 is a schematic circuit diagram of another embodiment of the air-conditioning system.

FIG. 4 shows another embodiment of the air-conditioning system in which is applied an automatic temperature control unit 40 for automatically controlling the temperature in the vehcle compartment at a predetermined temperature. The automatic temperature control unit 40 may contain a microprocessor or thermostat bridge circuit arrangement for sensing and controlling the temperature and is per se known and therefore is not detailed further.

In FIG. 4, the control unit 40 is connected to main and auxiliary control switches 41 and 42 respectively provided adjacent the driver's seat and the rear seat. The main control switch 41 includes a manually operable movable contact 411 which is movable to contact one of stationary contacts 412, 413, 414 and 415 respectively connected adjacent contacts in series with resistors 416, 417 and 418. The stationary contacts 412, 413, 414 and 415 respectively correspond to low fan speed, high fan speed, automatic and switch off position. Also, the auxiliary control switch 42 comprises a manually operable movable contact 421 and stationary contacts 422, 423 and 424 which are connected in series with resistors 425 and 426. The stationary contacts 422, 423 and 424 are arranged at respective positions corresponding to low fan speed, high fan speed and automatic control.

The main and auxiliary control switches 41 and 42 are connected to the control unit 40 via lines 43 and 44 and input terminals 401 and 402. The control unit 40 detects the switch positions of the main and auxiliary control switches 41 and 42 by the difference of the output potentials of the switches 41 and 42. Based on the detected switch positions of the main and auxiliary control switches, the control unit 40 controls operations of a compressor 45, and main and auxiliary fans 46 and 47. In turn, the control unit 40 is connected to a vehicle battery 48 via resistors 481 and 482.

Further, switches 491 and 492 are provided for on/off control of the fan 47 of the auxiliary cooling unit. The switches 491 and 492 are respectively arranged adjacent the driver's seat and the rear seat. The switches 491 and 492 function in a manner similar to that of the switches 35 and 36. The switches 491 and 492 are connected to an input terminal 403 of the control unit 40. The control unit 40 detects the switch position of the switches 491 and 492. Based on the detected switch position of the switches 491 and 492, the control unit 40 controls an electromagnetic valve for blocking and establishing communication between the compressor 45 and an evaporator (not shown), and the fan 47 of the auxiliary cooling unit.

In a modified embodiment, one of the lines 496 and 498 may be removed.

Further, it should be noted that the positions of the main and auxiliary cooling units are not specified in the foregoing arrangement. For example, the main cooling unit can be facilitated adjacent the rear seat and the auxiliary cooling unit can be facilitated adjacent the driver's seat, if desired.

What is claimed is:

1. A control system for an air-conditioner system of an automotive vehicle having main and auxiliary cooling units including a compressor, which main cooling unit has a larger capacity than that of said auxiliary cooling unit, said control system comprising:
   (a) a main control switch assembly associated with said main cooling unit for providing on/off control of the common compressor and allowing manual operation for controlling a main cooling unit fan for regulating the cooling air flow amount to be discharged through the main cooling unit;
   (b) an auxiliary control switch assembly associated with an auxiliary cooling unit for allowing manual operation for controlling the auxiliary cooling unit fan for regulating the cooling air flow amount to be discharged through said auxiliary cooling unit; and
   (c) an auxiliary cooling unit on/off switch cooperative with said main control switch, said auxiliary cooling unit on/off switch being kept inoperative when said main control switch is placed at an off position and being operative on and off when the main control switch is maintained at an on position.

2. A control system for an air-conditioner system of an automotive vehicle comprising:
   a compressor;
   a main cooling unit adapted to discharge main cooling air towards one of front and rear seats of the vehicle;
   an auxiliary cooling unit having smaller capacity than that of said main cooling unit and adapted to discharge auxiliary cooling air towards the other of said front and rear seats;
   a main control switch assembly provided between an electric power source and a main cooling unit driving circuit and associated with said main cooling unit for providing on/off control of the compressor and allowing manual adjustment for controlling a main coolling unit fan for adjusting the main cooling air flow amount to be discharged through the main cooling unit;
   an auxiliary control switch assembly connected to said electric power source via said main control switch and associated with said auxiliary cooling unit and allowing manual adjustment for controlling an auxiliary cooling unit fan for adjusting the auxiliary cooling air flow amount to be discharged through said auxiliary cooling unit,
   said auxiliary control switch assembly including a first manual switch positioned adjacent one of a driver's and rear seating area of said vehicle and a second manual switch positioned adjacent the other of the driver's and rear seating area of said vehicle, said first and second switches connected in a series circuit with each other and connected to said main control switch assembly for operating said auxiliary cooling unit fan; and
   an on/off switch cooperative with said main control switch, said on/off switch being kept inoperative when said main control switch is placed at an off position and being operative between on and off when the main control switch is maintained at an on position.

3. A system as set forth in claim 1 or 2, wherein said auxiliary cooling unit on/off switch comprises first and second manual switches respectively located adjacent a driver's seat and a rear seat, wherein each of said first and second manual switches is operable to turn the auxiliary cooling unit on and off independently of the other.

4. A system as set forth in claim 3, wherein said auxiliary cooling unit includes an auxiliary evaporator and said auxiliary cooling unit switch assembly further includes a relay responsive to said main control switch assembly and said first and second switches to complete an electrical circuit for enabling refrigerant to pass through said auxiliary evaporator.

5. A system as set forth in claim 4, wherein said main cooling unit discharges cooling air to a front portion of the vehicle compartment and said auxiliary cooling unit discharges cooling air to a rear portion of the vehicle compartment.

6. A dual air-conditioner system comprising:

a compressor;

a main cooling unit for adjustably producing a main cooling air flow as operated;

an auxiliary cooling unit for adjustably producing an auxiliary cooling air flow as operated;

a manually operative main control switch assembly associated with said compressor and said main cooling unit for controlling said compressor between operative and inoperative conditions and for controlling the operational mode of said main cooling unit including an off position thereof;

a manually operative auxiliary control switch assembly associated with said auxiliary cooling unit for controlling the operational mode of said auxiliary cooling unit including an off position thereof; and an auxiliary cooling unit driving circuit including said main control switch and said auxiliary control switch assemblies for driving said auxiliary cooling unit when said main and auxiliary control switch assemblies are both turned on, said driving circuit further including an on/off switch cooperative with said main control switch, said on/off switch being kept at an inoperative position when said main control switch is placed at the off position and being operative between on and off when the main control switch is maintained at an on position.

* * * * *